(12) United States Patent
Nagao

(10) Patent No.: US 7,536,027 B2
(45) Date of Patent: May 19, 2009

(54) DIGITAL CONTENT REPRODUCTION, DATA ACQUISITION, METADATA MANAGEMENT, AND DIGITAL WATERMARK EMBEDDING

(75) Inventor: Katashi Nagao, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/692,094

(22) Filed: Mar. 27, 2007

(65) Prior Publication Data

US 2007/0248241 A1  Oct. 25, 2007

(51) Int. Cl.
*G06K 9/00* (2006.01)
*H04L 9/00* (2006.01)

(52) U.S. Cl. .................. 382/100; 382/305; 382/306; 713/176

(58) Field of Classification Search ............. 382/100, 382/305, 306; 713/176
See application file for complete search history.

(56) References Cited

U.S. PATENT DOCUMENTS

| | | | |
|---|---|---|---|
| 6,005,678 A * | 12/1999 | Higashida et al. | 358/452 |
| 6,307,550 B1 * | 10/2001 | Chen et al. | 345/418 |
| 7,095,871 B2 * | 8/2006 | Jones et al. | 382/100 |

* cited by examiner

*Primary Examiner*—Wesley Tucker
(74) *Attorney, Agent, or Firm*—Michael J. Buchenhorner; Vazken Alexanian; Louis P. Herzberg

(57) ABSTRACT

The present invention provides methods, apparatus and systems to embed pointer information for metadata in content using a method that will not delete the information, so that metadata correlated with content can be correctly obtained, even after the contents have been edited. In an example embodiment, a user terminal for reproducing multimedia content comprises: a pointer information detector, for detecting pointer information that is embedded in the content and that points to the location of metadata in which information concerning the content is written; a network interface, for employing the pointer information to obtain the metadata via a network; and an index information generator, for employing the metadata to generate index information that is correlated with the data structure of the digital content.

2 Claims, 10 Drawing Sheets

Fig. 6

```
<video src="http://www.ibm.com/library/video/news01.mpg">
  <scene id="0" title=" No speech" begin="00:00:00:02" end="00:00:05:24"/>
  <scene id="1" title=" Copy a site to Netscape 3.0 ..." begin="00:00:05:24" end="00:00:20:08"
href="http://www.ibm.com/library/text/news01-1.html"/>
  <scene id="2" title=" Store in CD-R data obtained from Netscape ..." begin="00:00:20:08" end="00:00:38:01"
href="http://www.ibm.com/library/text/news01-2.html"/>
  <scene id="3" title=" Demand for copying of web data ..." begin="00:00:38:01" end="00:00:51:13"
href="http://www.ibm.com/library/text/news01-3.html"/>
  <scene id="4" title=" Either text or a photograph, or both of them can be selected ..." begin="00:00:51:13" end="00:01:01:00"
href="http://www.ibm.com/library/text/news01-4.html"/>
  <scene id="5" title=" A favorite photograph can also be stored on a CD ..." begin="00:01:01:00" end="00:01:06:14"
href="http://www.ibm.com/library/text/news01-5.html"/>
  <scene id="6" title=" So long as it is limited to personal use, an intellectual property ..." begin="00:01:06:14" end="00:01:19:25"
href="http://www.ibm.com/library/text/news01-6.html"/>
</video>
```

Contents ID1
| Scene ID1-1 | Scene ID1-2 | Scene ID1-3 | Scene ID1-4 | Scene ID1-5 |

Contents ID2
| Scene ID2-1 | Scene ID2-2 | Scene ID2-3 | Scene ID2-4 | Scene ID2-5 |

(B)

Contents ID3
| Contents ID1 | | | Contents ID2 | |
| Scene ID1-1 | Scene ID1-2 | Scene ID1-3 | Scene ID2-4 | Scene ID2-5 |

Fig. 10

```
<video src="http://www.ibm.com/library/video/news01.mpg">
<scene title="No speech" begin="00:00:00:02" end="00:00:05:24"/>
<scene title="Copy a site to Netscape 3.0..." begin="00:00:05:24" end="00:00:20:08"
href="http://www.ibm.com/library/text/news01-1.html"/>
<scene title="Store in CD-R data obtained from Netscape..." begin="00:00:20:08" end="00:00:38:01"
href="http://www.ibm.com/library/text/news01-2.html"/>
<scene title="Demand for copying of web data..." begin="00:00:38:01" end="00:00:51:13"
href="http://www.ibm.com/library/text/news01-3.html"/>
<scene title="Either text or a photograph, or both of them can be selected..." begin="00:00:51:13" end="00:01:01:00"
href="http://www.ibm.com/library/text/news01-4.html"/>
<scene title="A favorite photograph can also be stored on a CD..." begin="00:01:01:00" end="00:01:06:14"
href="http://www.ibm.com/library/text/news01-5.html"/>
<scene title="So long as it is limited to personal use, an intellectual property..." begin="00:01:06:14" end="00:01:19:25"
href="http://www.ibm.com/library/text/news01-6.html"/>
</video>
```

DIGITAL CONTENT REPRODUCTION, DATA ACQUISITION, METADATA MANAGEMENT, AND DIGITAL WATERMARK EMBEDDING

FIELD OF THE INVENTION

The present invention is directed to preparing metadata for digital contents, and for management of the digital contents and the metadata.

BACKGROUND

There is a current trend for video and speech to be recorded as digital data and for the thus prepared recordings to be widely distributed as multimedia (digital) contents. To process such multimedia (digital) contents (hereinafter referred to simply as contents), various devices have been proposed that capitalize on the ease with which digital data can be copied and edited. One such device involves the use of metadata, elements of which are correlated along the time axis of a recording with video and speech contents, employed to provide descriptions, to explain the contents, and how contents are formatted.

Metadata elements are used to describe the locations of correlated contents, and to provide information concerning data structures and data conversion and contents characteristics and relative definitions. As is shown in FIG. 10, metadata elements for video contents can be written for individual scenes. In FIG. 10, XML (Extensible Markup Language) is used to write the metadata elements, including scene tags, titles, scene start times and end times, and information linked to individual scenes.

That is, for the contents in FIG. 10, correlated metadata elements are provided for the video contents and text that provide a variety of information, including the start and the end times of scenes. Then, when a player (a video and speech reproduction apparatus) is used to interpret contents for which metadata elements are provided, the metadata enables it to process specific scenes based on the included contents.

For example, as is described above, since the start time and the end time for each scene in the contents are provided by an accompanying metadata entry, index information for each of the scenes can be generated by referring to the correlated metadata for the scene. The index information is presented for a user and accompanies the display of an image of the text of the title for the scene or the first image of the scene, thereby permitting a user to employ the index information to generate a summary by reproducing or deleting an arbitrary scene.

The methods for providing metadata corresponding to contents include a method for distributing contents and metadata together, and a method for adding, to contents, a pointer to the metadata and address information for a site whereat the metadata are stored, and for obtaining from contents corresponding metadata. When the contents and the metadata are integrally assembled, a user can obtain the contents and the metadata at the same time; however, updating only the metadata without changing the contents is difficult. Therefore, it is more convenient for the contents and the metadata to be managed separately, so that a user who obtains contents can refer to desired metadata by using pointer and address information (hereinafter this information is generally referred to as pointer information).

However, according to the conventional method for correlating contents with metadata using time codes, i.e., the start time and the end time of a scene, the correlation of contents and metadata will be destroyed when the contents are edited. This problem arises because, timing information included with metadata includes timing for contents that has not yet been edited, so the metadata does not correspond to contents when the timing for a scene is changed by editing the contents.

Therefore, when contents are distributed for which correlation with timing information in the metadata is destroyed due to editing, a user who obtains the edited contents can not generate appropriate index information by using the metadata for the contents. The user can not perform a process, such as a search or the generation of a summary, based on the edited contents. Further, when only contents are distributed first and edited, pointer information for metadata added to the contents are lost through editing. Therefore appropriate metadata for the contents will not be obtained.

SUMMARY OF THE INVENTION

It is, therefore, one aspect of the present invention to embed pointer information for metadata in contents using a method that will not delete the information, so that metadata correlated with contents can be correctly obtained, even after the contents have been edited.

It is another aspect of the present invention to employ a method whereby deletion information is inhibited from being embedded in contents pointer information indicating the location of metadata, so that the metadata required for the processing of contents can be easily obtained and processed, even after the contents have been edited.

In an example embodiment of present invention, a digital contents reproduction apparatus for reproducing digital contents includes: a detector to detect pointer information that is embedded in digital contents and that points to the location of metadata in which information concerning the digital contents is written; a metadata acquisition unit to employ the pointer information in obtaining the metadata via a network; and an index information generator employ the metadata in generating index information correlated with the data structure of the digital contents.

In a further example embodiment, when the digital contents includes timing elements, the index information generator compares time code detected in the digital contents accompanying the metadata to generate index information that is appropriate for the time code.

BRIEF DESCRIPTION OF THE DRAWINGS

The invention aspects and advantages are best understood by reference to the following detailed description of an illustrative embodiment when read in conjunction with the accompanying drawings, wherein:

FIG. 6 is an example diagram showing example metadata in which a scene ID is written in accordance with the embodiment.

FIGS. 9A and 9B are specific diagrams showing examples of information to be embedded in contents according to the embodiment.

FIG. 10 is a diagram showing an example structure of metadata.

DESCRIPTION OF THE SYMBOLS

Figure 1:
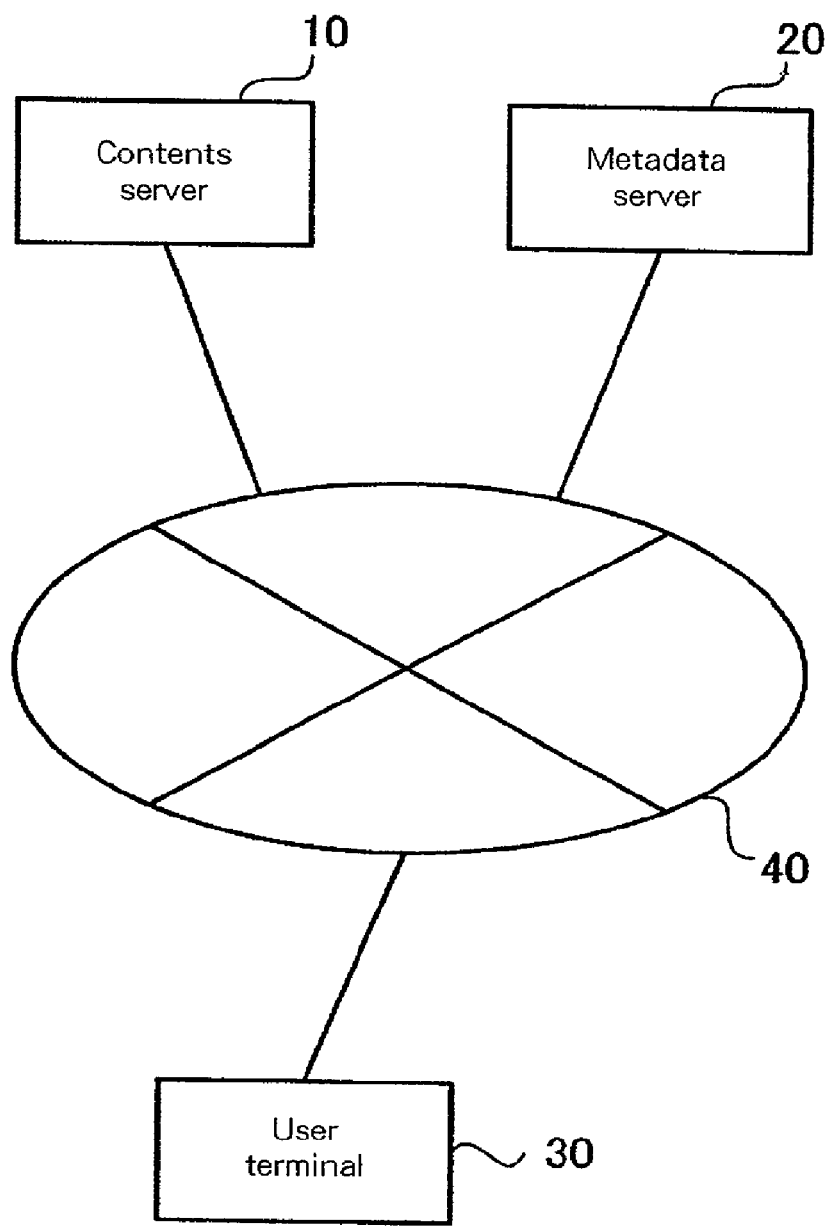
FIG. 1 is an example diagram showing a system configuration according to one embodiment of the present invention for obtaining multimedia contents and metadata.

10: Contents server
20: Metadata server
30: User terminal
31: Network interface
32: Pointer information detector
33: Address acquisition unit
34: Index information generator
35: Output controller
36: Display device
40: Network
50: Data processor
500: Contents display window

DETAILED DESCRIPTION OF THE INVENTION

The present invention provides efficient methods, apparatus and systems to embed pointer information for metadata in contents using a method that will not delete the information, so that metadata correlated with contents can be correctly obtained, even after the contents have been edited.

In an embodiment, the present invention employs a method whereby deletion information is inhibited from being embedded in contents pointer information indicating the location of metadata, so that the metadata required for the processing of contents can be easily obtained and processed, even after the contents have been edited.

In a further example embodiment the present invention provides a digital contents reproduction apparatus for reproducing digital contents which includes: a detector to detect pointer information that is embedded in digital contents and that points to the location of metadata in which information concerning the digital contents is written; a metadata acquisition unit to employ the pointer information in obtaining the metadata via a network; and an index information generator employ the metadata in generating index information correlated with the data structure of the digital contents.

In a further example embodiment, when the digital contents includes timing elements, the index information generator compares time code detected in the digital contents accompanying the metadata to generate index information that is appropriate for the time code.

Often, the digital contents reproduction apparatus includes an address acquisition unit, for employing pointer information detected by the detector to obtain for the metadata an address on a network, wherein the metadata acquisition unit is connected to a network and obtains desired metadata from the address obtained by the address acquisition unit. As is described above, an address is not directly embedded in digital contents, but instead, pointer information corresponding to an address is embedded. Thus, even for data for which the relevant address is large or has a variable length, such as a URI (Universal Resource Identifier) that serves as an address for contents on the Internet, corresponding information can be embedded in the digital contents.

In addition, sometimes the digital contents reproduction apparatus includes an index information display unit, for displaying, in correlation with a state wherein digital contents index information that is generated by the index information generator are reproduced.

According to the present invention, a digital contents reproduction apparatus having the following configuration is provided. In a particular embodiment, the digital contents reproduction apparatus includes: contents reproduction means, for reproducing video digital contents; and index information display means, for displaying index information corresponding to a scene in the video digital contents based on time code for the video digital contents. When the video digital contents are edited, the index information display means especially reflects, in the index information, the state wherein the video digital contents are edited.

Further, according to the present invention, an example embodiment of a digital contents reproduction apparatus for reproducing digital contents includes: management information detection means for detecting management information that is embedded in the digital contents and related to the digital contents; missing portion detection means for detecting a missing portion in the digital contents, based upon metadata in which information concerning the digital contents is written, and based upon the management information detected in the digital contents; and contents complement means, connected to a network, for obtaining the missing portion of the digital contents from a contents server on the network.

According to the present invention, a program is provided that enables a computer to perform the functions of a digital contents reproduction apparatus. This program can be distributed by being stored on a recording medium such as a magnetic disk, an optical disk or a semiconductor memory, or by being transmitted via a network from the storage device of a program transmission apparatus.

Furthermore, the present invention provides a data acquisition system having the following configuration. In an example embodiment the data acquisition system includes: a metadata server, connected to a network, for storing metadata in which information concerning digital contents is written; and a reproduction apparatus for reproducing the digital contents, wherein the reproduction apparatus detects information embedded as a digital watermark in the digital contents and that is related to metadata having a structure information consonant with the digital contents, and employs the information related to the metadata to receive metadata corresponding to the digital contents from the metadata server via the network.

In some embodiments, the data acquisition system further includes: a contents server, connected to the network, for storing digital contents, wherein when there is a missing portion in predetermined digital contents, the reproduction apparatus obtains from the contents server digital contents corresponding to the metadata, based on information obtained from the metadata server concerning the location of the predetermined digital contents.

Further, according to the present invention, an example embodiment of a digital contents reproduction method for reproducing video digital contents includes the steps of: detecting pointer information embedded in the video digital contents and that points to the location of metadata in which information concerning the video digital contents is written; employing the pointer information to obtain the metadata via a network; employing the metadata to generate index information corresponding to a scene in the video digital contents; and displaying the index information and the video digital contents in correlation with each other.

In addition, according to the present invention, an example embodiment of a digital contents reproduction method for reproducing digital contents includes the steps of: detecting management information embedded in and related to the digital contents; detecting a missing portion in the digital contents based on metadata in which information concerning the digital contents is written and on the management information detected in the digital contents; establishing a connection to a network; obtaining the missing portion of the digital contents from a contents server on the network; synthesizing the missing portion with the digital contents; and reproducing the resultant digital contents.

Moreover, the present invention provides a metadata management method having the following configuration. The metadata management method includes the steps of: storing in a metadata server provided on a network, metadata in which information concerning predetermined digital contents is written; setting pointer information pointing to the location of the metadata on the network; and embedding in digital contents corresponding to the metadata, corresponding structure information as written both in the metadata and the pointer information.

At the step of embedding information in the digital contents, the structure information and the pointer information are embedded as digital watermarks. When the digital contents are edited, pointer information for the edited metadata is additionally embedded in the digital contents.

The present invention also provides a digital watermark embedding method for embedding watermark information in video digital contents includes the steps of: embedding metadata identification information for identifying metadata for the video digital contents throughout the video digital contents; and embedding, in each scene of the video digital contents, scene identification information for identifying the scene.

In some embodiments a program is provided that permits a computer to perform these embedding processes. This program is generally distributed by being stored on a recording medium, such as a magnetic disk, an optical disk a semiconductor memory, or by being transmitted, via a network, from the storage device of a program transmission apparatus.

Furthermore, according to the present invention, a recording medium is provided on which are recorded digital contents, structure information for the digital contents, and pointer information embedded in the digital contents and that points to the location on a network of metadata concerning the digital contents. The pointer information and the structure information are embedded as digital watermarks in the digital contents.

An advantageous embodiment of the present invention will now be described in detail while referring to the accompanying drawings following a further overview of the present invention. Generally, pointer information used to describe the correlation of contents data, such as video or speech data and metadata, is embedded in the contents data using a data hiding technique. The data hiding technique is a technique for embedding through format conversion, predetermined information in contents, such as a static picture, a moving picture or speech. The data hiding technique is generally employed for digital watermarking or digital signing, and the information embedded in the contents using this technique is sufficiently robust to resist the editing of the contents. Further, pointer information for metadata corresponding to a predetermined scene or phrase in contents data is embedded in the portion of the contents data relevant to the scene or the phrase. Therefore, even when the contents are edited, the correlation between the metadata and the contents for the scene or the phrase are not destroyed.

The technique provided by the present invention can be used for various types of contents, such as static pictures, moving pictures and speech. The example used for the description employed for this embodiment is one wherein the pointer information for metadata is embedded in video contents for moving pictures.

FIG. 1 is an example diagram showing a system configuration in accordance with are embodiment for obtaining multimedia contents and metadata. The system includes: a contents server 10, a metadata server 20 and a user terminal 30, all of which are connected to a network 40, such as the Internet. The contents server 10 stores video and speech contents, and distributes the contents upon receiving a request from the user terminal 30. The pointer information for corresponding metadata is then added to the contents stored in the contents server 10, as will be described later. The metadata server 20 stores metadata corresponding to the contents stored in the contents server 10, and distributes the metadata upon receiving a request from the user terminal 30. The metadata stored in the metadata server 20 are managed for each scene in the contents as is described later. Various languages can be used to write metadata, but in this embodiment XML (Extensible Markup Language) is employed.

Physically, the contents server 10 and the metadata server 20 may be provided separately, and independently connected to the network 40, or they may be provided as components of a single computer, even though logically they are operated as separate servers. The user terminal 30 is constituted as a computer, such as a personal computer, and possesses reproduction and editing functions it employs as a player of contents obtained from the contents server 10.

The contents and the metadata can be distributed not only by being transmitted via the network 40, from the contents server 10, or the metadata server 20, but also by being stored on a recording medium, such as an optical disk, a magnetic disk or a semiconductor memory.

In this embodiment, a data hiding technique is used to embed pointer information for the metadata in the contents stored in the contents server 10. The pointer information includes the address of the metadata corresponding to the contents, and includes scene IDs used to identify scenes in the contents. The address of the metadata is used to identify the location of the metadata on the network 40, and is embedded throughout the video signal. The scene IDs include identifying information (scene ids) for scene tags included in the metadata, and a relevant ID is embedded in each scene in the contents. Therefore, the scene IDs are employed as management information to be used for managing the scenes in the contents. Since the addresses of the metadata and the scene IDs are embedded using different keys in different contents layers, they do not interfere with each other.

A scene ID is embedded in each of the frames of a scene using the data hiding technique. As a specific example, 12 bits of data can be embedded in each frame beginning at a location corresponding to one arbitrary time code and ending at a location corresponding to an arbitrary time code that serves as a delimiter for the scene. In some cases, the creator of the metadata arbitrarily determines the delimiter that is to be used between scenes. In this example means that 4096 scene IDs can be embedded in one frame. This generally constitutes a satisfactory amount of data to be used to identify a scene.

Since the scene ID is embedded in all the frames of the pertinent scene, even when only part of the scene is extracted the scene ID can be accurately read from the data for the extracted contents.

The address of the metadata is dispersed among and repetitively embedded in the contents data using the data hiding technique. As an example, 72 bits of data can be embedded in each interval of about one second. Since 72 bits of data are equivalent to nine bytes, nine information bearing characters, one byte can be embedded for each character. However, with this amount of information, it is difficult to directly embed data having a variable length, such as the URIs (Universal Resource Identifiers) that are employed for the addresses of contents on the Internet. Therefore, when a URI is employed as an address for metadata, a method is employed whereby a string of nine characters that corresponds to each URI for metadata is embedded as the address information for the metadata, and whereby a user terminal 30 that reproduces the contents recovers the URI from the address information.

As is described above, since the data sizes of the addresses (the address information) provided for all the metadata are large, addresses can not be uniformly embedded in all the frames. However, since address information is dispersed and repetitively embedded, so long as the remaining contents have, at the least, a specific length, even after the contents have been divided by editing the probability that URIs can be recovered is high. In the example wherein 72 bits of data are embedded in each interval of one second, a URI can be recovered so long as an interval equal to or longer than one second remains.

The metadata stored in the metadata server 20 are the same as the metadata that are conventionally prepared for a variety of contents. In this embodiment, metadata are generated for each video contents scene, and are correlated with a relevant scene using the applicable scene ID. When the metadata are written in XML, the scene ID can be written as an attribute of a scene tag used to identify the scene.

FIG. 6 is an example diagram showing an example wherein scene IDs are written for the metadata in FIG. 10. In FIG. 6, the underlined portions are descriptions of scene IDs.

Further, the locations of original contents correlated with metadata are written in the metadata, so that the contents can be obtained based on the metadata.

Figure 2:
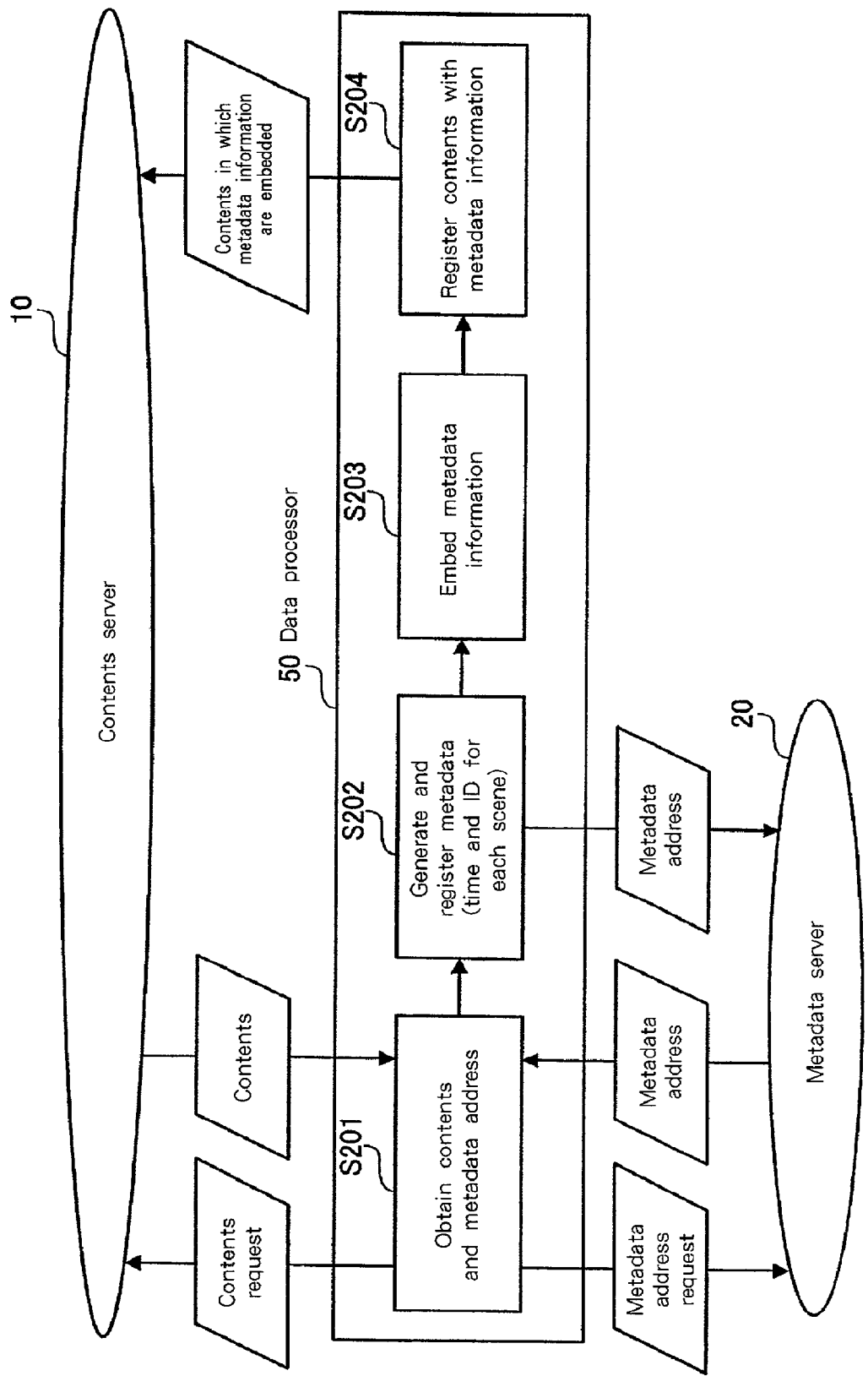
FIG. 2 is an example diagram showing the entire processing according to the embodiment for correlating metadata with contents.

An explanation will now be given for the process for correlating metadata with contents, i.e., the process for embedding, in contents, pointer information for corresponding metadata. FIG. 2 is an example diagram showing the general processing for correlating metadata with contents. This processing can be performed by a predetermined data processor 50 that is connected to the contents server 10 and the metadata server 20 in FIG. 1. The data processor 50, the contents server 10 and the metadata server 20, as well as the user terminal 30, may be connected via a general network 40, such as the Internet, or may be connected via a local network.

Further, when the functions of the contents server 10 and the metadata server 20 are physically implemented by a single computer, this computer may be used as the data processor 50.

As is shown in FIG. 2, the data processor 50 issues a request to the contents server 10 and obtains contents to which metadata are to be added. Further, the data processor 50 requests of the metadata server 20 an address for an area in which to store the metadata that corresponds to the contents. The metadata server 20 then establishes an area for storing the metadata, provides an address, and forwards the address to the data processor 50 (step 201).

Next, the data processor 50 prepares metadata for each scene in the contents data. As is described above, at least the start time and the end time of a scene, as well as the scene ID, are written in the metadata. The metadata that are then registered at the address provided by the metadata server 20 at step 201 (step 202).

Thereafter, the data processor 50 embeds, in the contents, pointer information for the metadata that have been prepared (step 203). As is described above, the pointer information includes the address of the metadata and of the scene ID. The address of the metadata is embedded throughout the contents, and a scene ID is embedded in each corresponding scene. As is described above, instead of the address of the metadata, address information that corresponds to this address is embedded. The data processor 50 registers, with the contents server 10, the contents in which the pointer information for the metadata has been embedded (step 204).

In the above explanation, after the contents are obtained from the contents server 10 and the pointer information for the metadata has been embedded therein, the resultant contents are registered with the contents server 10. This processing is performed for an example wherein, when the creator of the contents differs from the creator of the metadata, the creator of the contents registers the contents with the contents server 10 and the metadata creator then prepares the metadata and correlates them with the contents. On the other hand, when the creator of the contents is also the creator of the metadata, first the contents and the metadata may be generated and correlated with each other, and then the contents in which pointer information for the metadata has been embedded may be stored in the contents server 10.

An explanation will now be given for the user terminal 30 that reproduces contents in which pointer information for metadata is embedded. As is described above, the user terminal 30 is implemented by a computer, such as a personal computer, and includes: a network interface for obtaining contents and metadata through the network 40, and output means for outputting the contents. The output means is a display device when the contents are moving pictures and static pictures. When the contents are music contents, the output means is a speech output mechanism, such as a loudspeaker.

Figure 3:
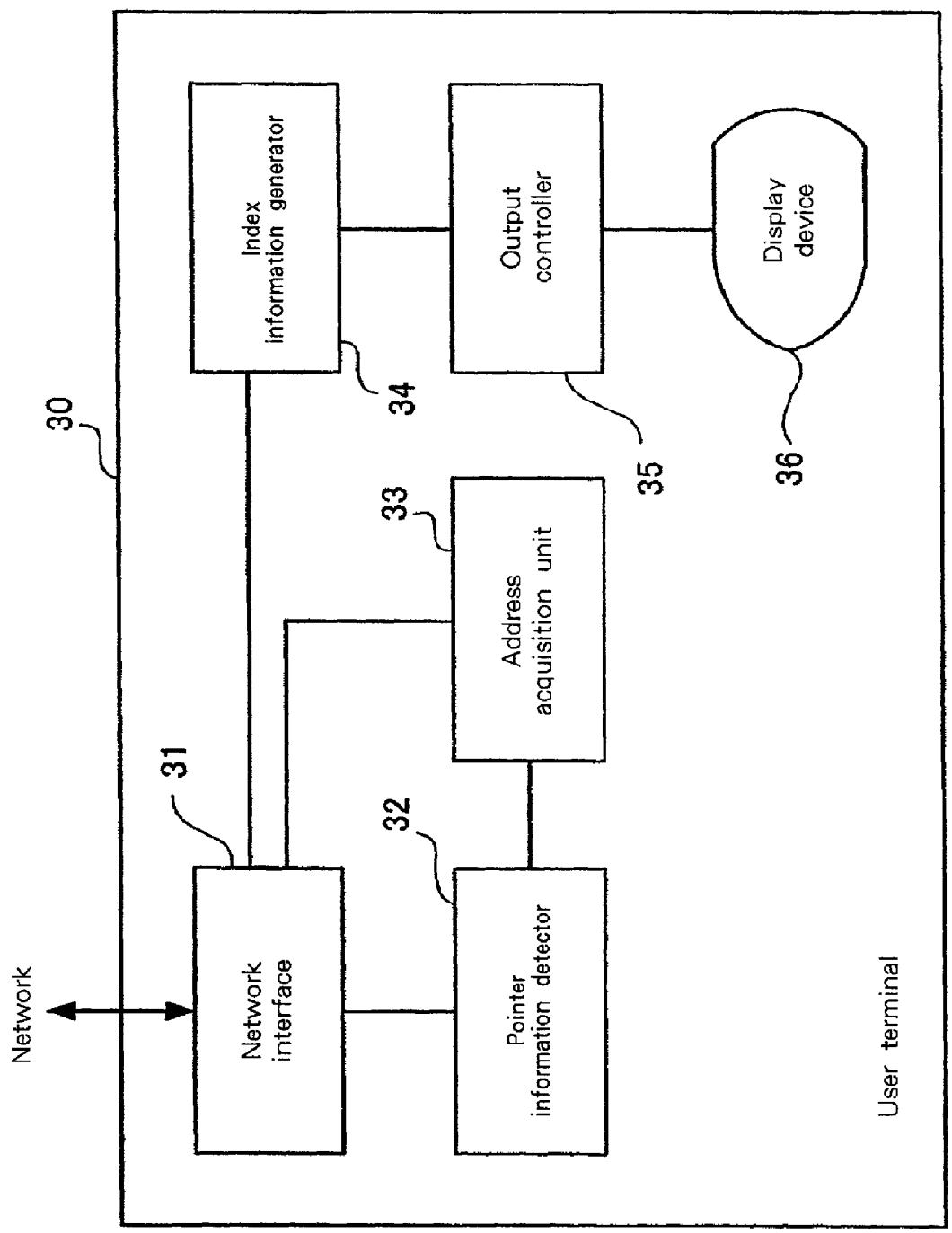
FIG. 3 is an example diagram showing the configuration of a user terminal according to the embodiment.

FIG. 3 is an example diagram showing the configuration of the user terminal 30 in this embodiment. In FIG. 3, the user terminal 30, which is the contents reproduction apparatus, includes: a network interface 31, for connection to the network 40; a pointer information detector 32, for detecting, in contents, pointer information for metadata; an address acquisition unit 33, for obtaining, from the detected pointer information, an address based on the address information for the metadata; an index information generator 34, for generating index information, which will be described later; an output controller 35, for outputting contents together with the index information; and a display device 36.

With this arrangement, the pointer information detector 32, the address acquisition unit 33, the index information generator 34 and the output controller 35 are software blocks implemented by the CPU, which is controlled by a program. Of these components, the address acquisition unit 33 is not a requisite component, and is not required when the address of the metadata is embedded as pointer information in the contents.

The components of the user terminal 30 in FIG. 3 are related to characteristic functions of the embodiment, and actually, although not shown, the user terminal 30, serving as the contents reproduction apparatus, provides general functions, such as storage means, for storing the obtained contents and metadata, and control means, for processing the contents and the metadata and for controlling the network interface 31 and establishing communication with various servers. The user terminal 30 can supply the contents that are distributed, not only via the network 40 but also by being stored on a recording medium, such as an optical disk, a magnetic disk or a semiconductor memory. Therefore, although not shown, a reader for the recording medium is also provided.

The user terminal 30 in FIG. 3 reads contents from the contents server 10, or various recording media, and reproduces them. At this time, pointer information embedded in the contents is detected, and metadata corresponding to the contents are obtained based on the pointer information. Then, based on the metadata, index information is prepared to manage scenes in the contents. The index information can be displayed at the same time as the contents are reproduced, while the user terminal 30 uses the metadata to perform various processes for the contents.

Figure 4:
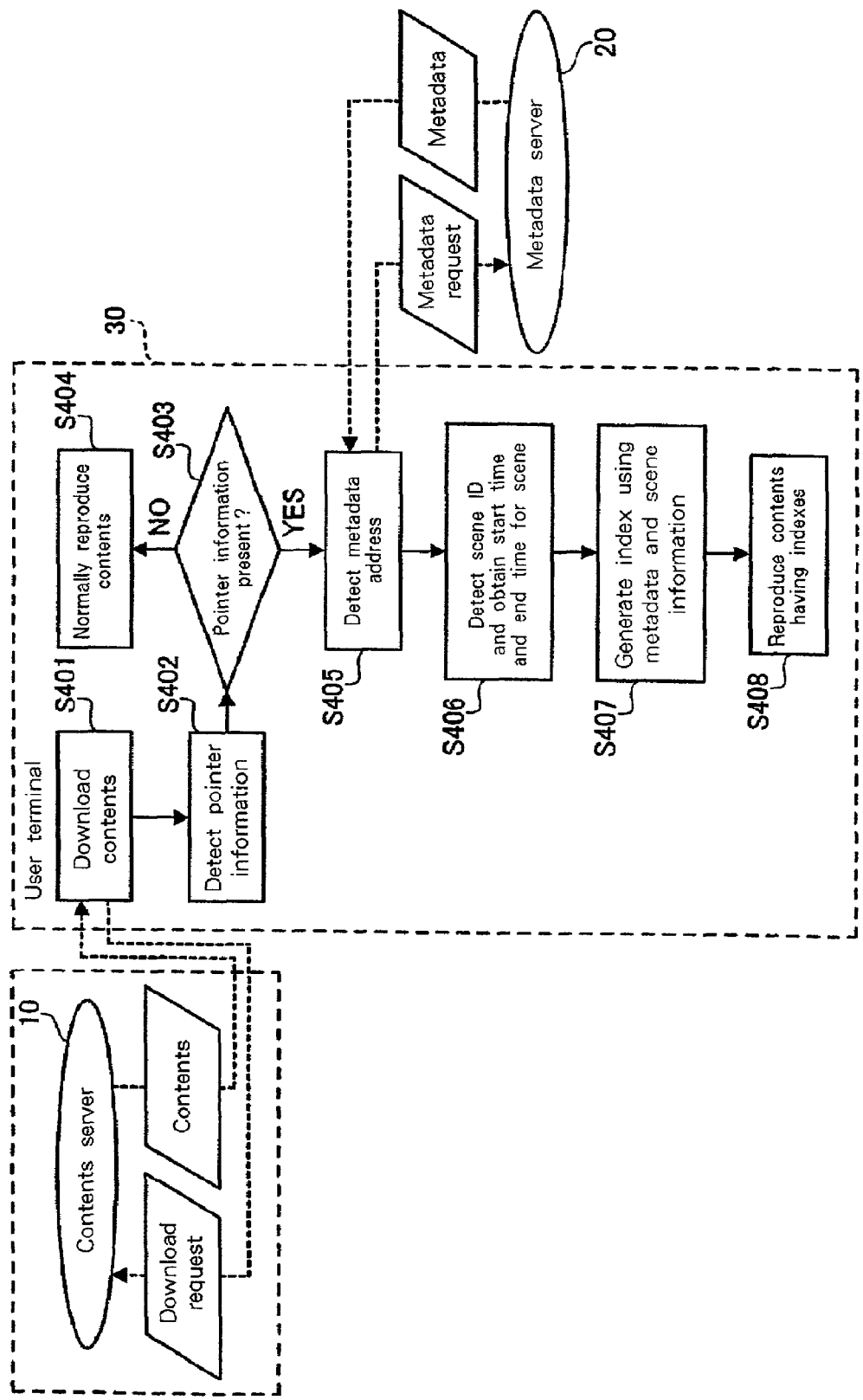
FIG. 4 is an example diagram for explaining the processing according to the embodiment for obtaining contents from a contents server and reproducing the contents.

FIG. 4 is an example diagram for explaining the processing performed to obtain contents from the contents server 10 and to reproduce the contents. First, the user terminal 30 employs the contents reproduction software or other communication software to connect to the contents server 10 via the network interface 31 and the network 40, and obtains predetermined contents (step 401). For the acquisition of the contents, if the metadata for the pertinent contents are obtained in advance, an inquiry, based on the metadata, can be issued to the contents server 10 and the contents can be downloaded. Further, the contents can be acquired via another route (using a search engine or linking to other contents). Contents that are stored on a recording medium, such as an optical disk, a magnetic disk or a semiconductor memory, can be extracted using a reader, such as an optical disk drive.

The pointer information detector 32 of the user terminal 30 detects, in the obtained contents, pointer information indicating the location of metadata (step 402). Since, as is described above, the pointer information is embedded in the contents using the data hiding technique, the pointer information can be detected by comprehensively scanning the contents, employing the same process as is used when detecting other data, such as a digital watermark, that are embedded in contents using the data hiding technique.

When due to data deterioration a portion is encountered in which pointer information can not be detected, data for that portion can be supplemented by employing data detected in preceding and succeeding frames. When pointer information for metadata is not detected, it is assumed that the metadata are not present or that their correlation with the contents has been destroyed, and the user terminal 30, without obtaining the metadata, activates the contents reproduction software and reproduces the contents (steps 403 and 404). When the pointer information for the metadata is detected, the index information generator 34 is connected to the metadata server 20 via the network interface 31 and the network 40, and employs the address of the metadata included in the detected pointer information to request and acquire the pertinent metadata (steps 403 and 405). When, instead of the metadata address, address information that corresponds to individual addresses is embedded in the contents, the address acquisition unit 33 uses the address information to recover the metadata address, and based on the recovered address, the index information generator 34 issues an inquiry to the metadata server 20.

In order to recover the address itself using the address information, a correlation table, representing the correlation of address information and respective addresses, is prepared in the user terminal 30 and is used to obtain a desired address.

When address information is generated using an address based on a predetermined rule, a desired address can be obtained by employing a calculation expression used with address information to acquire addresses. The index information generator 34 compares scene IDs embedded in metadata, which are obtained using pointer information that is detected in contents, to accurately acquire a scene ID for each of the scenes included in the contents.

When the metadata obtained from the metadata server 20 are used as the index information for the contents, and when the contents obtained by the user terminal 30 have already been edited, the timing for each scene in the index information does not match the timing for each scene actually contained in the contents. Therefore, the index information generator 34 employs the contents, and the scene IDs in the pointer information detected in the contents, to generate timing information for each scene that is inherent to the contents (step 406).

Specifically, a frame wherein scene IDs are changed is detected by referring to the pointer information, and the time code for the frame is calculated. Thus, the start time and the end time for a portion including a scene ID (a scene) can be identified for each scene ID detected in the contents. Then, a record string having the following form is generated for each scene ID in the contents.

<scene id="scene ID" begin="the start time for a portion wherein a scene ID is embedded" end="the end time for a portion wherein a scene ID is embedded" [another attribute that is embedded in metadata and concerns the scene ID]/>

In the record string, the attribute concerning the scene ID included in the metadata need only be posted from the metadata. When the contents obtained by the user terminal 30 have not been edited (are original contents), the thus prepared index information is the same as the metadata. The output controller 35 of the user terminal 30 employs the record string, generated by the index information generator 34, as index information inherent to the contents (step 407). In this embodiment, the index information is dynamically generated based on the obtained contents and the metadata for the contents. Therefore, when the contents have already been edited and the correlation of the metadata with the original contents has been destroyed, index information corresponding to the edited contents can be obtained. Finally, the output controller 35 of the user terminal 30 generates a contents display window, and displays the generated index information on the display device 36 while reproducing the contents (step 408).

Figure 5:
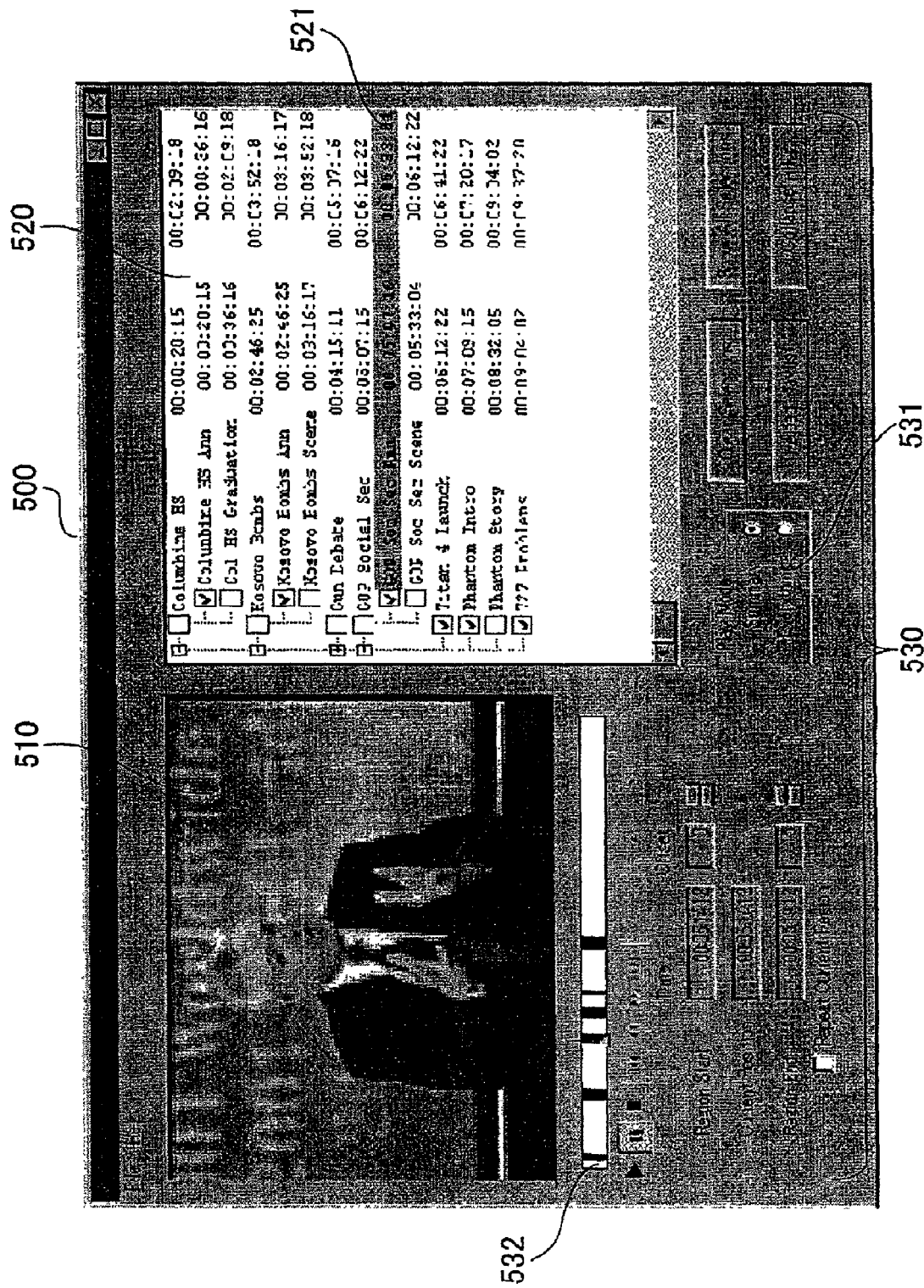
FIG. 5 is an example diagram showing an example structure of a contents display window with indexes in accordance with the embodiment.

FIG. 5 is an example diagram showing the structure of a contents display window with indexes. In FIG. 5, the contents display window 500 presents a contents display column 510 for displaying the contents, an index display column 520 for displaying index information for the contents, and operation tools 530 for controlling the contents reproduction process and for editing the contents based on the index information. In the index display column 520, a shaded portion 521 is used to indicate which scene is currently being displayed in the contents display column 510. Further, since Summary is selected in a Play Mode column 531 of the operation tools 530, only the scene for which a tick has been placed in the check box in the index display column 520 is reproduced. An indicator 532, in the operation tools 530, indicates where a scene to be reproduced (the scene for which a tick has been placed in the check box in the index display column 520) is located in the body of the contents, and also points to the portion that is currently being reproduced.

In the example in FIG. 5, the contents display column 510 and the index display column 520 are provided in a single window; however, they may be displayed in separate windows. Further, as needed, the display of the contents and the display of the index information can be hidden.

The user terminal 30 can perform various processes for the contents by employing, as a user interface, the contents display window 500 in FIG. 5, in which the contents and index information that accurately corresponds to the contents are displayed. As is described above, according to this embodiment, regardless of whether the contents have been edited, the correlation of the contents and metadata is maintained by using index information that accurately corresponds to the contents. Therefore, the user terminal 30 can extract a desired scene by using the check box in the index display column 520 or the operation tools 530, or can summarize the contents by reproducing several designated scenes.

Further, since the correlation of the contents and the metadata is maintained regardless of whether the contents have been edited, the user terminal 30 can display, as an annotation (e.g., a telop or a pop-up), the text data that are added to the contents by using the metadata.

In addition, since the correlation of the contents and the metadata is maintained, regardless of whether the contents have been edited, the user terminal 30 can display in their entirety the contents and an external resource that is correlated using the metadata. For example, when the hyperlink to different contents that include information concerning a specific matter in specific contents is provided by the metadata, the different contents can be displayed by tracking the hyperlink. Since the different contents can be displayed in a window that differs from the contents display window 500, the user terminal 30 can present not only the contents in the contents display column 510 but also information concerning the matter contained in the pertinent contents.

The above described process can be performed by a conventional reproduction apparatus so long as the contents obtained by the user terminal 30 have not yet been edited, i.e., are original contents and the correlation of the contents and metadata is maintained. However, when the contents obtained by the user terminal 30 have already been edited and the correlation with the metadata has been destroyed, the above process can not be carried out. In this embodiment, as is described above, index information corresponding to the contents is dynamically generated by using the metadata and the pointer information embedded in the contents, and the contents are correlated with the metadata. Therefore, even when the contents have been edited, the above process, using the metadata, can be performed.

An explanation will now be given for the process for recovering a scene that has been missed due to the editing of the contents. In this embodiment, correlation is established between the contents obtained by the user terminal 30 and the metadata for the original contents that are stored in the metadata server 20, and the metadata are employed, regardless of whether the contents have been edited. Therefore, the metadata to be used corresponds to the original contents (before they are edited). Thus, when the obtained contents have been edited, the user terminal 30 can employ the metadata to recover a portion that has been deleted by editing the contents. In this process, it is premised, based on information written in the metadata indicating the location of the original contents, that means are prepared for accessing the original contents, i.e., that the user terminal 30 can be connected to the contents server 10.

Figure 7:
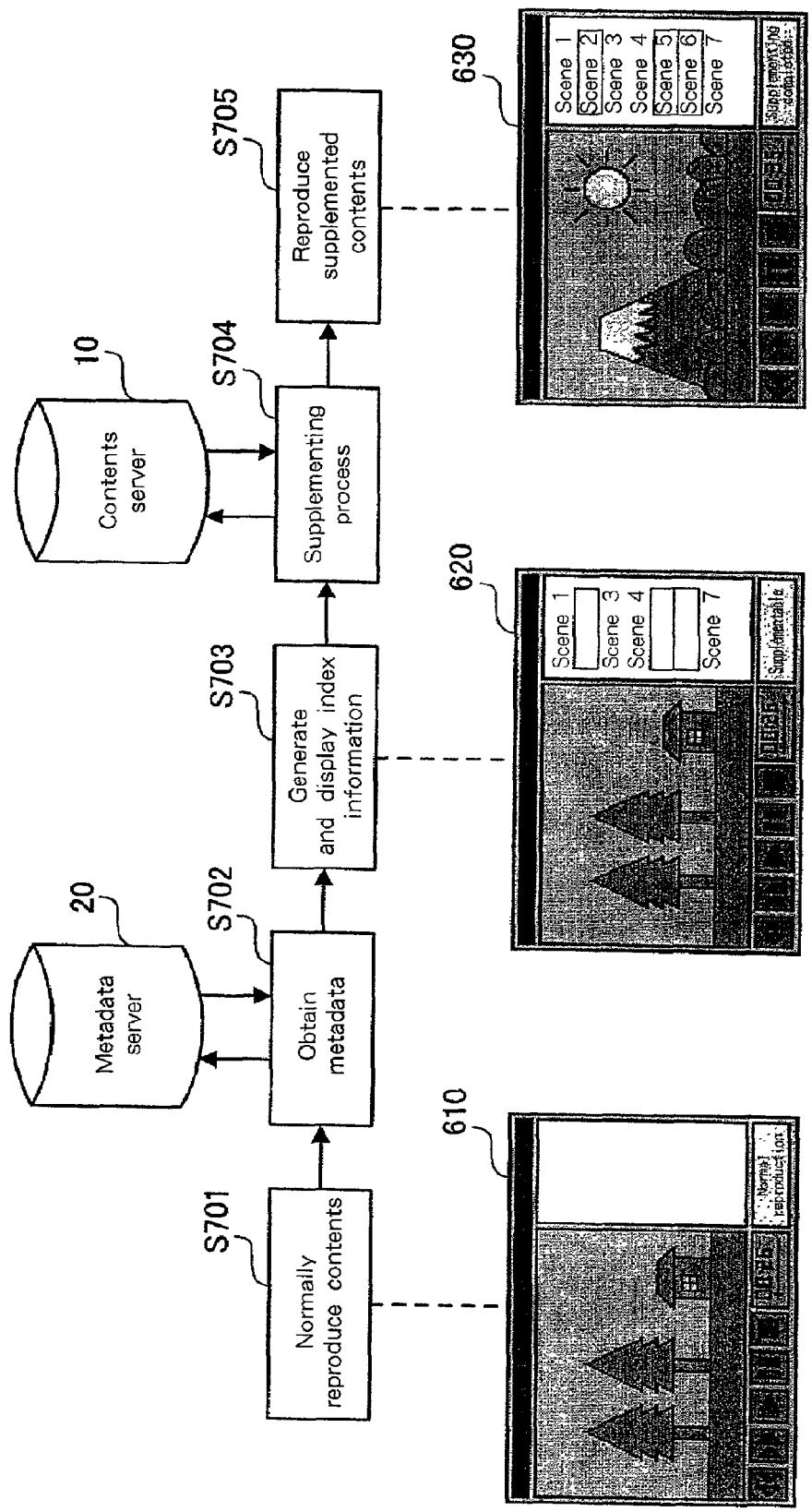
FIG. 7 is a schematic diagram for explaining the processing according to the embodiment for using metadata to recover a missing scene in the contents.

FIG. 7 is a schematic diagram for explaining the processing performed, using the metadata, to recover a missing scene in the contents. In FIG. 7, first, the user terminal 30 obtains the contents (step 701), and then employs pointer information for the metadata that is embedded in the contents to obtain from the metadata server 20 the metadata for the contents (step 702). Thereafter, index information corresponding to the contents is generated (step 703).

In FIG. 7, the state wherein the obtained contents are reproduced in the contents display window 500 is directly shown in a window 610. Then, the state wherein the obtained contents, together with the index information in the contents display window 500, are reproduced is shown in a window 620. As is apparent from the window 620, the contents have been edited, and scene 2, scene 5 and scene 6 have been deleted from the original contents.

Following this, the user terminal 30 employs the information, written in the metadata that are obtained at step 702, concerning the location of the original contents and is connected to the contents server 10 to access the original contents corresponding to the metadata, and supplement the edited contents (step 704). Then, the contents, together with the scene being supplemented, are reproduced (step 705). In FIG. 7, the state wherein scenes 2, 5 and 6 (omitted in the windows 610 and 620) are supplemented, is shown in a window 630.

Figure 8:
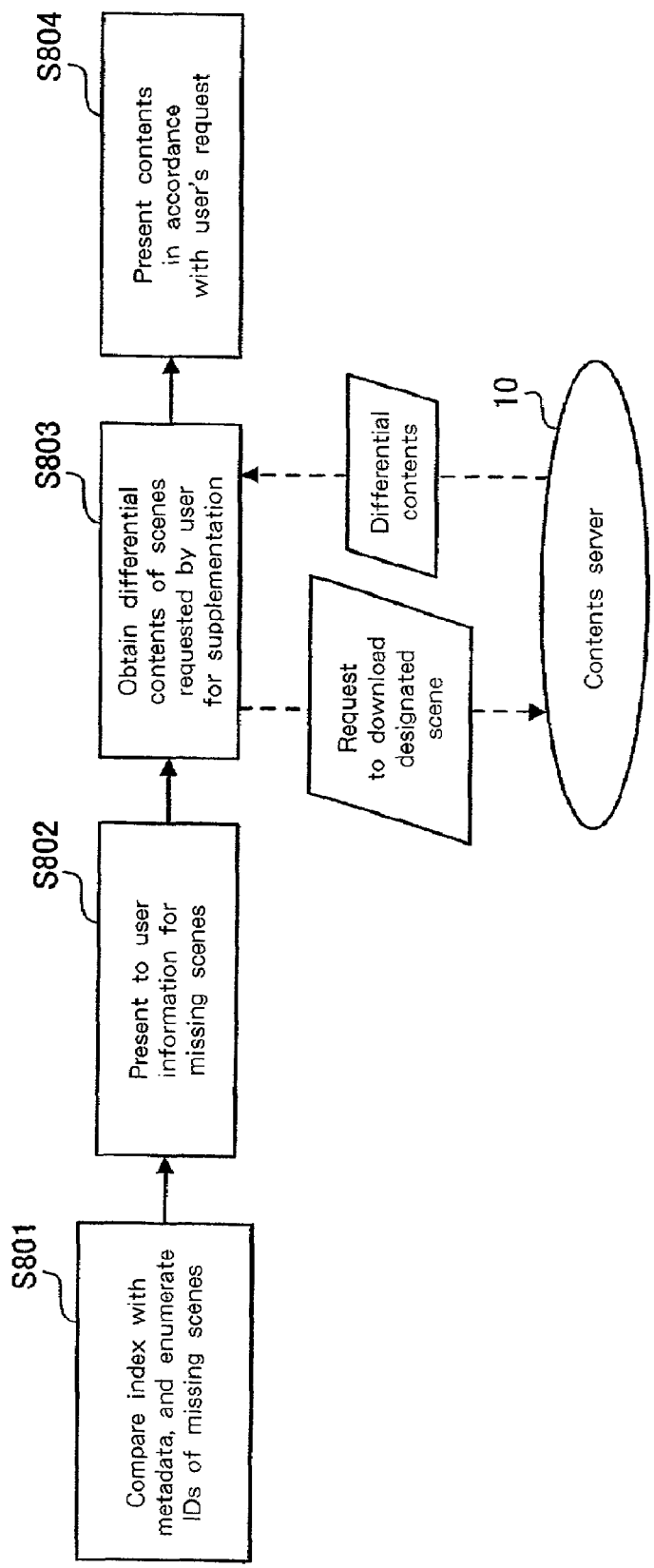
FIG. 8 is a detailed diagram for explaining the supplementing process at step 704 in FIG. 7.

FIG. 8 is a detailed diagram for explaining the supplementing process performed at step 704 in FIG. 7. In the supplementing process in FIG. 8, first, at the user terminal 30, the index information generator 34 compares the index information generated at step 703 in FIG. 7 with the metadata obtained at step 702, and enumerates the scene IDs of the scenes that have been missed (step 801). The output controller 35 then presents, for the user, information for the missing scenes by displaying it in the contents display window 500 or in another new window (step 802).

The user thereafter refers to the information for the missing scenes, and issues a request for the supplementing of a desired scene. The supplementing request can be issued for all the missing scenes, or for only one or for several selected missing scenes. Then, the user terminal 30 is connected to the contents server 10, via the network interface 31, based on information written in the metadata concerning the location of the original contents, and requests the downloading, from the original contents corresponding to the metadata, of a scene for which supplementing has been requested (step 803). Since the start time and the end time of the requested scene in the original contents can be obtained by referring to the metadata, the scene to be downloaded can be designated by specifying the start time and the end time. Upon receiving the downloading request, the contents server 10 extracts the requested scene from the original contents and transmits it to the user terminal 30.

When the user terminal 30 has received the missing scene from the contents server 10, in accordance with a request received from a user, the output controller 35 reproduces, in the contents display window 500, the contents that include the supplemented scene (step 804). Then, when supplemented scenes have been prepared for all the scenes missed in the contents that were obtained first, the reproduced contents equal the original contents. However, when instead of the original contents only a scene (a difference in the contents) desired by a user is downloaded, communication traffic can be reduced and the time required for the transfer of data can be shortened. In addition, when a supplemented scene is a part of the missing scenes, the user can select only a desired scene for supplementing, and the time required for downloading unnecessary scenes can be further reduced.

The above processes, including the process for recovering a missing scene, are performed at the user terminal 30 using the obtained contents and the metadata. In this embodiment, since information concerning the metadata is embedded in the contents, correlated data can be obtained bi-directionally from contents to metadata and from metadata to contents, so that the above processes can be performed. In this embodiment, since the information concerning the metadata is embedded in the contents, a contents creator can efficiently manage multiple versions of the contents that are generated while the contents are being prepared.

An explanation will now be given for a method for managing a version using information that is embedded in the contents. First, the contents and metadata creator prepares the primary data for the contents and the corresponding metadata, and embeds the pointer information for the metadata in the contents. When a second set of data are prepared by editing the contents, additional pointer information for the metadata that corresponds to the second set of data is embedded in the second set of data. Therefore, the pointer information for the metadata that corresponds to the primary data and the pointer information for the metadata that corresponds to the second set of data are embedded in the second set of data. Similarly, when the second set of data are further edited, additional pointer information for the metadata that corresponds to a third set of data is embedded in the contents.

The metadata that correspond to the edited contents (the second or the third set of data) are generated by unifying and processing the metadata that correspond to the contents that have not yet been edited (the primary data or the second set of data). Therefore, data concerning the editing history are automatically added to the metadata. Thus, the metadata for all the data used for the editing process can be referred to, and an understanding of the editing condition of the data, from the original (primary) data to the final data, can be obtained by comparing the metadata contents.

FIGS. 9A and 9B are specific diagrams showing an example of the information to be embedded in the contents. In FIG. 9A, information is embedded in two contents (primary data), contents ID1 and contents ID2. The contents IDs (the address of the metadata can be used) are embedded throughout the contents ID1 and ID2 as primary data, and scene IDs are also embedded in all the scenes. In FIG. 9B, information is embedded in contents ID3 (second set of data) that is synthesized by editing the contents ID1 and the contents ID2.

When the information in FIG. 9A is compared with the information in FIG. 9B, it is apparent that to form the contents ID3, the scenes ID2-3, ID2-4 and ID2-5 of the contents ID2 are added following the scenes ID1-1, ID2-3 and ID1-3 of the contents ID1. In this embodiment, the video contents for a moving picture have been employed as the digital contents. However, a method for embedding in the contents the pointer information for the metadata can also be employed for music contents and static picture contents.

When the method is applied for music contents, for example, the address of the metadata can be embedded throughout the speech signals, and a phase ID can be embedded in each predetermined phrase of the music contents. When the method is employed for static picture contents, merely the address of the metadata is embedded throughout the image signal and is employed, while taking into account that for static pictures there will be more requests to view the original contents than to use editing to acquire a missing portion, and that the data size of a static picture is smaller than the data size of a moving picture or of speech.

As is described above, according to the present invention, when the pointer information for the metadata is embedded using a method for inhibiting the deletion of data, the metadata corresponding to the contents can be accurately obtained, even from the contents that have been edited.

According to the present invention, when the pointer information for the metadata is embedded in the contents using a method for inhibiting the deletion of data, the metadata required for processing the contents can be easily obtained and processed, even after the contents have been edited.

What is claimed, is:

1. A digital watermark embedding method for embedding watermark information in video digital content, said method comprising steps of:
    embedding, throughout the video digital content, metadata identification information for identifying metadata for said video digital content; and
    embedding, in each scene of said video digital content, scene identification information for identifying said scene,
    being employed for reproducing video digital content and further comprising the steps of:
    detecting pointer information that is embedded in said video digital content and that points to the location of metadata in which information concerning said video digital content is written;
    employing said pointer information to obtain said metadata via a network;
    employing said metadata to generate index information corresponding to a scene in said video digital content; and
    displaying said index information and said video digital content in correlation with each other,
    wherein said step of employing said metadata to generate index information includes the steps of:
    detecting time code from said video digital contents; and
    comparing time code detected in said digital contents accompanying said metadata, and generating index information that is appropriate for said time code.

2. The digital watermark embedding method according to claim 1, wherein said step to obtain said metadata includes the steps of:
    employing pointer information detected by said detector to obtain for said metadata an address on a network; and
    establishing a connection to a network and obtaining said metadata from said address obtained by said address acquisition unit.

* * * * *